United States Patent
Rodgers et al.

(10) Patent No.: US 9,278,585 B2
(45) Date of Patent: Mar. 8, 2016

(54) SYSTEM AND METHOD FOR USING A LIGHTWEIGHT SPARE TIRE

(71) Applicant: GM GLOBAL TECHNOLOGY OPERATIONS LLC, Detroit, MI (US)

(72) Inventors: William R. Rodgers, Bloomfield Township, MI (US); Hamid G. Kia, Bloomfield Hills, MI (US); Mark W. Verbrugge, Troy, MI (US); Michael J. Irwin, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 14/107,032

(22) Filed: Dec. 16, 2013

(65) Prior Publication Data

US 2015/0165833 A1    Jun. 18, 2015

(51) Int. Cl.
| | |
|---|---|
| G01M 17/013 | (2006.01) |
| B60C 19/00 | (2006.01) |
| B60C 5/02 | (2006.01) |
| B60C 7/00 | (2006.01) |
| B60C 9/00 | (2006.01) |
| B60C 5/00 | (2006.01) |

(52) U.S. Cl.
CPC ............... *B60C 19/00* (2013.01); *B60C 5/002* (2013.01); *B60C 5/02* (2013.01); *B60C 7/00* (2013.01); *B60C 9/0028* (2013.04); *B60C 9/0042* (2013.04); *B60C 2019/004* (2013.04); *Y10T 152/10009* (2015.01)

(58) Field of Classification Search
USPC ........... 73/146, 146.4, 146.5, 115.01, 115.07, 73/115.08; 340/426.33, 441, 442, 445, 340/446, 447
See application file for complete search history.

(56) References Cited

U.S. PATENT DOCUMENTS

| | | | | |
|---|---|---|---|---|
| 4,252,378 | A * | 2/1981 | DeBolt et al. | 301/64.702 |
| 6,985,076 | B1 * | 1/2006 | Bennie et al. | 340/445 |
| 2003/0042890 | A1 * | 3/2003 | Normann et al. | 324/162 |
| 2004/0069385 | A1 * | 4/2004 | Timoney et al. | 152/69 |
| 2010/0147061 | A1 * | 6/2010 | Weston | 73/146 |
| 2011/0000596 | A1 | 1/2011 | Sachdev | |
| 2013/0026816 | A1 * | 1/2013 | Kia et al. | 301/95.102 |
| 2015/0130261 | A1 * | 5/2015 | Warren | 73/146 |

* cited by examiner

*Primary Examiner* — Eric S McCall
(74) *Attorney, Agent, or Firm* — John A. Miller; Miller IP Group, PLC

(57) ABSTRACT

A lightweight spare tire system. The lightweight spare tire system includes a carbon fiber composite vehicle rim that is suitable for use with a spare tire and a lightweight tire that is suitable for use with the carbon fiber composite rim. The lightweight tire and rim creates a lightweight spare wheel that may be used on a vehicle.

19 Claims, 5 Drawing Sheets

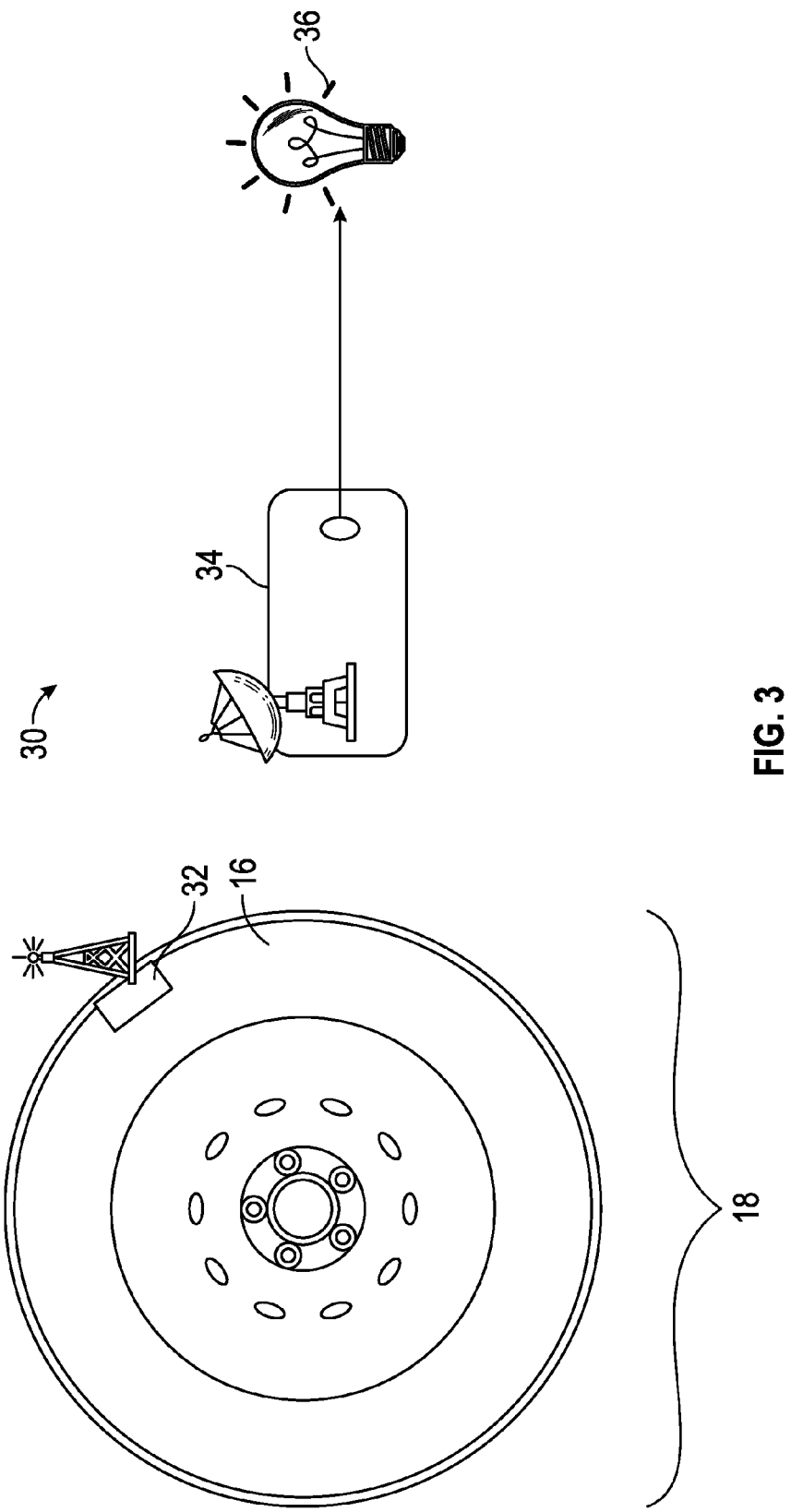

SYSTEM AND METHOD FOR USING A LIGHTWEIGHT SPARE TIRE

BACKGROUND OF THE INVENTION

1. Field of the Invention

This invention relates generally to lightweight spare wheels and, more particularly, to lightweight spare wheels that include a lightweight rim and a lightweight tire, and a system and method for monitoring the use of spare wheels.

2. Discussion of the Related Art

Maximizing fuel efficiency in vehicles is a major concern of automotive engineers. With respect to spare tires or wheels, the use of a temporary spare tire provides the benefit of taking up less storage space and is lighter than a full-sized tire, thus providing better fuel efficiency and increased spaciousness, as well as ease of handling during a tire change.

A typical spare tire rim is made from a suitably strong and durable metal alloy material, such as steel or aluminum. Steel rims are typically around 8 kg, and aluminum rims are typically about 5.5. kg. In a full size tire with thick tread sections and heavy steel and/or polyester belts, the average weight of the resulting rim and tire assembly, i.e., the wheel, is approximately 12 kg. A compact spare tire with thick tread sections and heavy steel and/or polyester belts has an average weight of approximately 6 kg. While this is lighter than the full size wheel, there is still a need in the art to reduce the weight of spare tires. The lowered weight or mass of the spare tire translates to a lower mass of the overall vehicle, which is expected to lead to an improvement in fuel economy.

Another consideration for engineers when dealing with spare tires is safety. While vehicle tire systems that monitor characteristics such as tire pressure are known, for example, as disclosed in U.S. Patent Application Publication No. 2011/0000596 to Sachdev et al., entitled "Low Noise Run-Flat Tires", filed Jul. 2, 2009, assigned to the assignee of this application and incorporated by reference, these systems do not detect the use of a spare tire. Currently, once a spare tire is installed there is no mechanism to indicate that the spare tire has been installed or to track how long it has been on the vehicle. Thus, there is also a need in the art for a system and method that detects the use of a spare tire and that warns the driver when the spare tire is reaching the end of its life.

SUMMARY OF THE INVENTION

In accordance with the teachings of the present invention, a lightweight spare tire system is disclosed. The lightweight spare tire system includes a carbon fiber composite vehicle rim that is suitable for use with a spare tire and a lightweight tire that is suitable for use with the carbon fiber composite rim. The lightweight tire and rim creates a lightweight spare wheel that may be used on a vehicle.

Additional features of the present invention will become apparent from the following description and appended claims, taken in conjunction with the accompanying drawings.

BRIEF DESCRIPTION OF THE DRAWINGS

FIG. 3 is a schematic diagram of a wheel with an embedded sensor and an exemplary process for determining spare tire use;

DETAILED DESCRIPTION OF THE EMBODIMENTS

The following discussion of the embodiments of the invention directed to a lightweight spare tire and a system and method for monitoring the use of a spare tire is merely exemplary in nature, and is in no way intended to limit the invention or its applications or uses.

Figure 2:
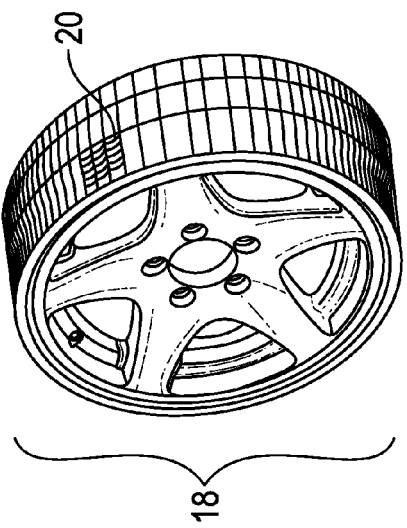
FIG. 2 illustrates a vehicle wheel that includes a rim and a lightweight tire.
Figure 1:
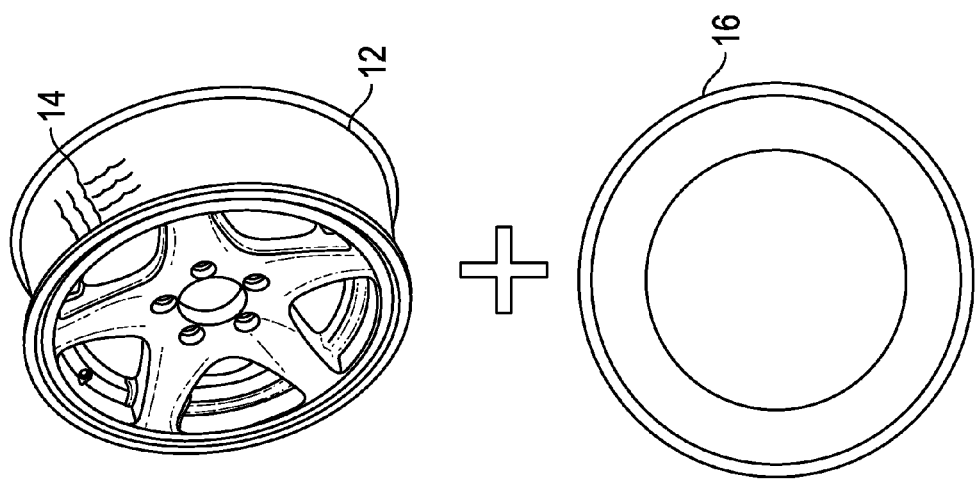
FIG. 1 illustrates a vehicle rim and a lightweight tire.

FIGS. 1 and 2 illustrate a vehicle rim 12 and a lightweight tire 16 that create a spare wheel 18. The rim 12 is made of a carbon fiber composite or a similar material that is thermoset or thermoplastic. The composite may include randomly oriented fibers or may include directed angle fibers, where reinforcing fibers run at particular angles. These fibers are generally represented by reference numeral 14. In either case, the rim 12 that results from the composite material discussed above is approximately 40% lighter than aluminum wheels that are currently on the market.

The lightweight tire 16 may be any suitable design, such as, for example, replacing the steel belts that are typically used in tires with woven carbon fiber belts, polyester belts, as represented by reference numeral 20, or by using a foam-filled, tubed, or advanced run flat tire, etc., thereby further reducing the weight of a resulting wheel. While tubed tires have been known and used for many years, the combination of the lightweight rim 12 and the lightweight tire 16 create a spare wheel 18 shown in FIG. 2 that is lighter than known spare tires or wheels and that provides improved vehicle fuel economy as well as ease of handling.

FIG. 3 is a schematic diagram of a wheel sensor system 30 that includes a sensor 32, for example, a piezoelectric sensor embedded within the inner layers of the lightweight spare tire 16. The sensor 32 will communicate wirelessly with a controller 34 that is mounted in the vehicle. The sensor 32 should not provide a signal from the spare tire 16 if the wheel 18 is not mounted and in use because the wheel 18 will not be experiencing external forces. When the spare wheel 18 is installed, the embedded sensor 32 will begin to send signals with each rotation of the installed spare wheel 18. The controller 34 detects this signal and begins the process of tracking the length of time the sensor 32 is producing a signal. The controller 34 also tracks vehicle speed and therefore distance driven while using the spare wheel 18. When the signal is no longer detected, the distance traveled is stored in a memory of the controller 34 until the signal from the sensor 32 is detected by the controller 34 again.

While the signal from the sensor 32 is being detected by the controller 34, the distance traveled is compared to a predetermined value for the distance covered during the useful life of the spare wheel 18. When the distance traveled reaches a predetermined limit of the expected life of the spare wheel 18, a warning signal is sent to a display warning 36 indicating to a driver of the vehicle that the expected lifetime of the spare tire 16 is being approached, i.e., that the expected lifetime of the spare wheel 18 is almost used up. When the distance traveled exceeds the expected life of the spare wheel 18, a permanent warning is set for the driver.

Figure 4:
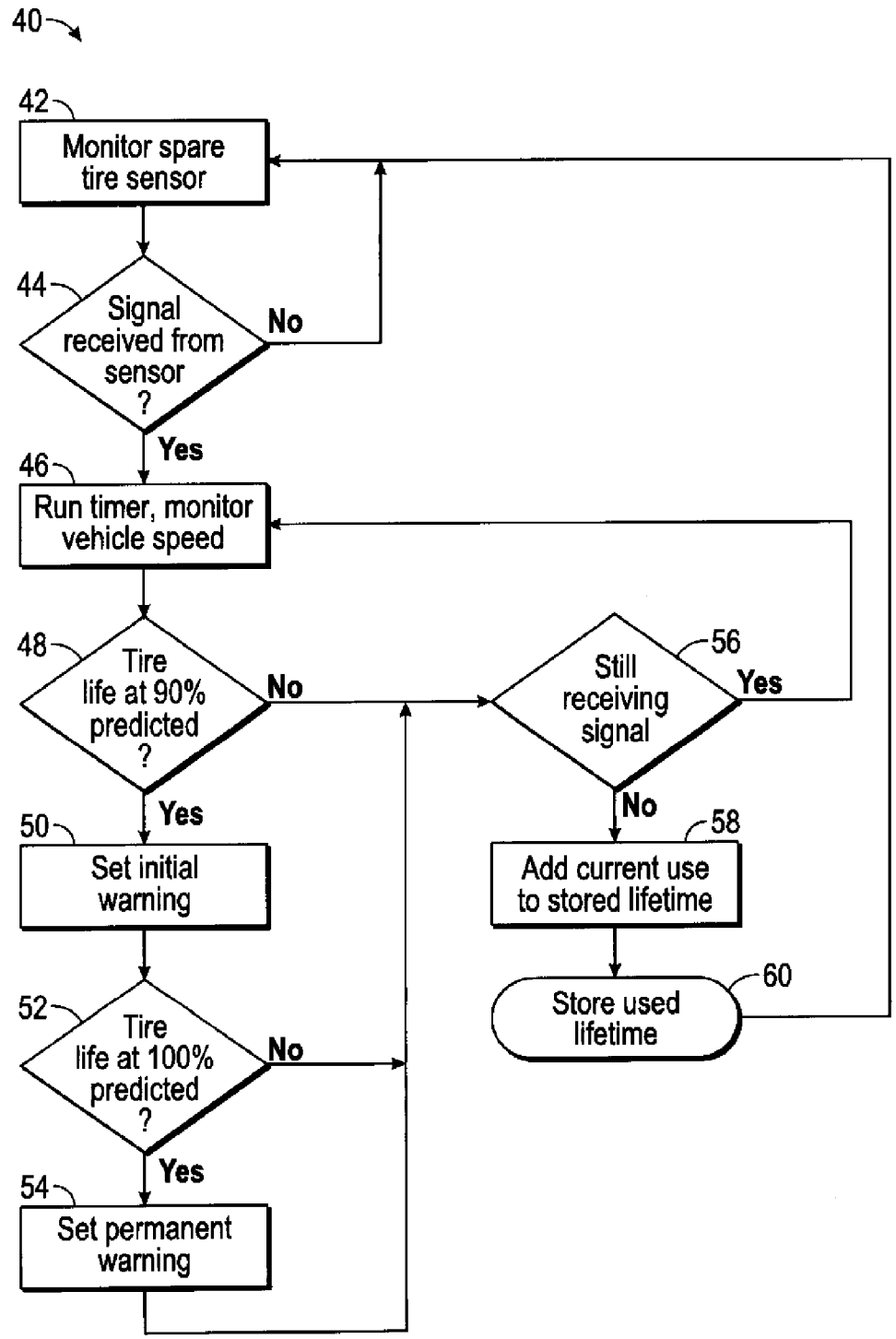
FIG. 4 is a flow diagram of an exemplary process for determining the use of a spare tire that includes an embedded sensor.

FIG. 4 is a flow diagram 40 of a process for monitoring the spare wheel 18 using the embedded sensor 32. The process begins at box 42 when an algorithm of the controller 34 monitors the sensor 32. The algorithm determines if a signal is being received from the sensor 32 by the controller 34 at decision diamond 44. If yes, a run timer of the controller 34 monitors the length of time the signal is received and the controller also monitors vehicle speed at box 46. If no, the algorithm returns to box 42 to monitor the sensor 32.

Once the timer and vehicle speed monitoring begins at the box 46, the algorithm determines if the life of the tire 16 of the spare wheel 18 has reached a first predetermined threshold, such as, for example, approximately 90% of the predicted life of the tire 16, at decision diamond 48. If yes, an initial warning is set at box 50 and the algorithm determines if the life of the tire 16 of the spare wheel 18 has reached a second predetermined threshold, such as, for example, approximately 100% of the predicted life of the tire 16, at decision diamond 52. If the second predetermined threshold is achieved, as determined at the decision diamond 52, a permanent warning is set that alerts a driver of the vehicle that the spare wheel 18 needs to be replaced at box 54.

If the first predetermined threshold is not reached at the decision diamond 48, or if the second predetermined threshold is not reached at the decision diamond 52, or if the permanent warning has been set at the box 54, the algorithm determines if the signal from the sensor 32 is still being received by the controller 34 at decision diamond 56. If yes, the algorithm returns to the box 46 and continues to monitor time and speed as discussed above. If no, the algorithm adds the recorded use of the spare wheel 18 to a stored lifetime value for the wheel 18 and the tire 16 at box 58. Once the use of the spare wheel 18 is stored in a memory of the controller 34 at the box 60, the algorithm returns to box 42 to monitor the sensor 32 and wait for the wheel 18 to be used again. In this way, the total use of the spare wheel 18 is monitored, regardless of breaks between uses, if any.

Figure 5:
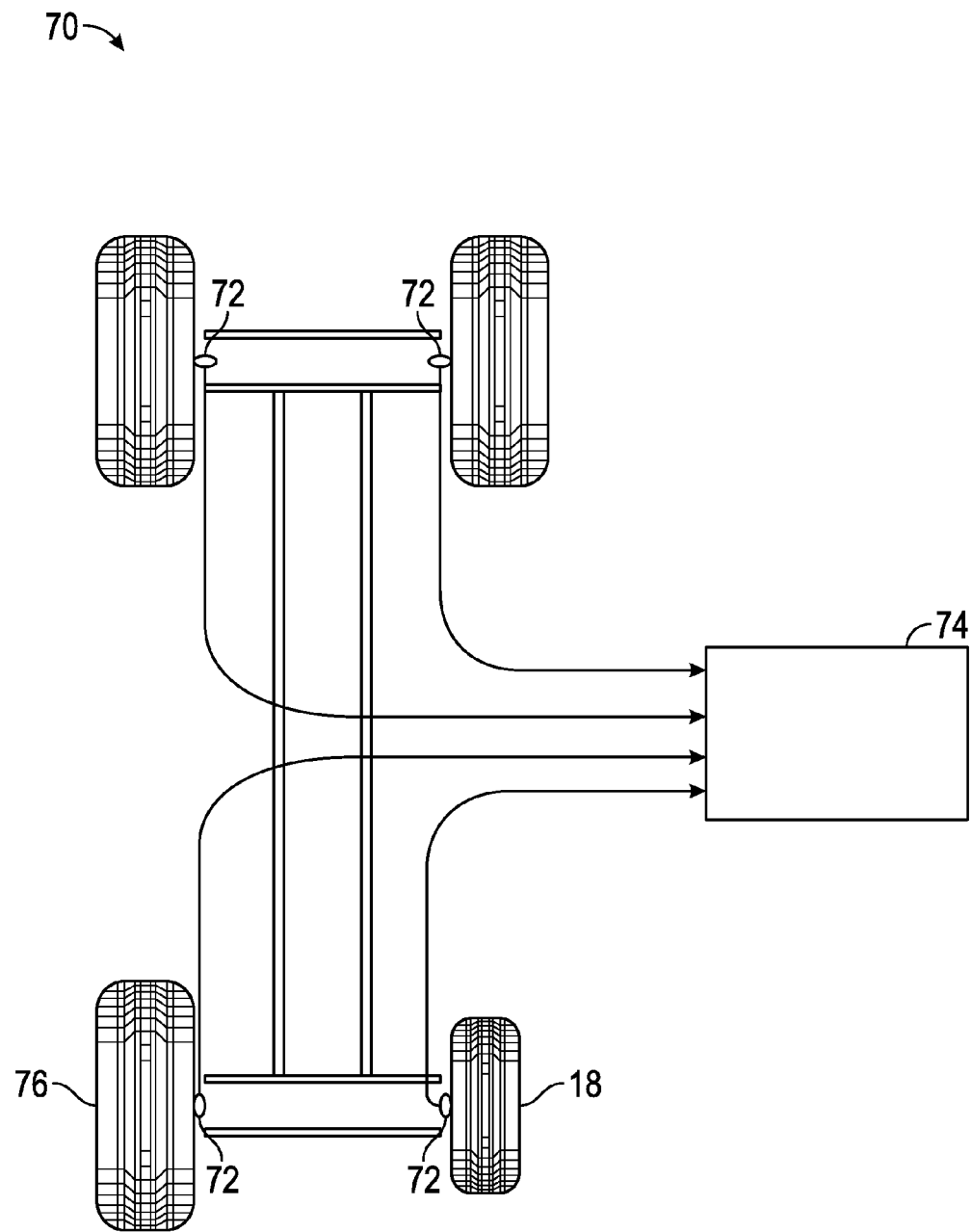
FIG. 5 is a schematic diagram of a another vehicle wheel sensor system.

FIG. 5 is a schematic diagram of a vehicle wheel sensor system 70 that is another option for monitoring the lifetime of the spare wheel 18. The system 70 includes sensors 72 that are, for example, wheel speed sensors, at each wheel, such as the spare wheel 18 and the other standard size wheels, represented by wheel 76. The system 70 also includes a controller 74, which may be the same controller or different from the controller 34. The sensors 72 monitor vehicle wheel speed such that the use of the spare wheel 18 may be determined by the controller 74 based on the rotation speed difference of the spare wheel 18 compared to the other wheels 76. Using time and speed, the controller 74 further calculates wear on the spare wheel 18, as is described in more detail below.

Figure 6:
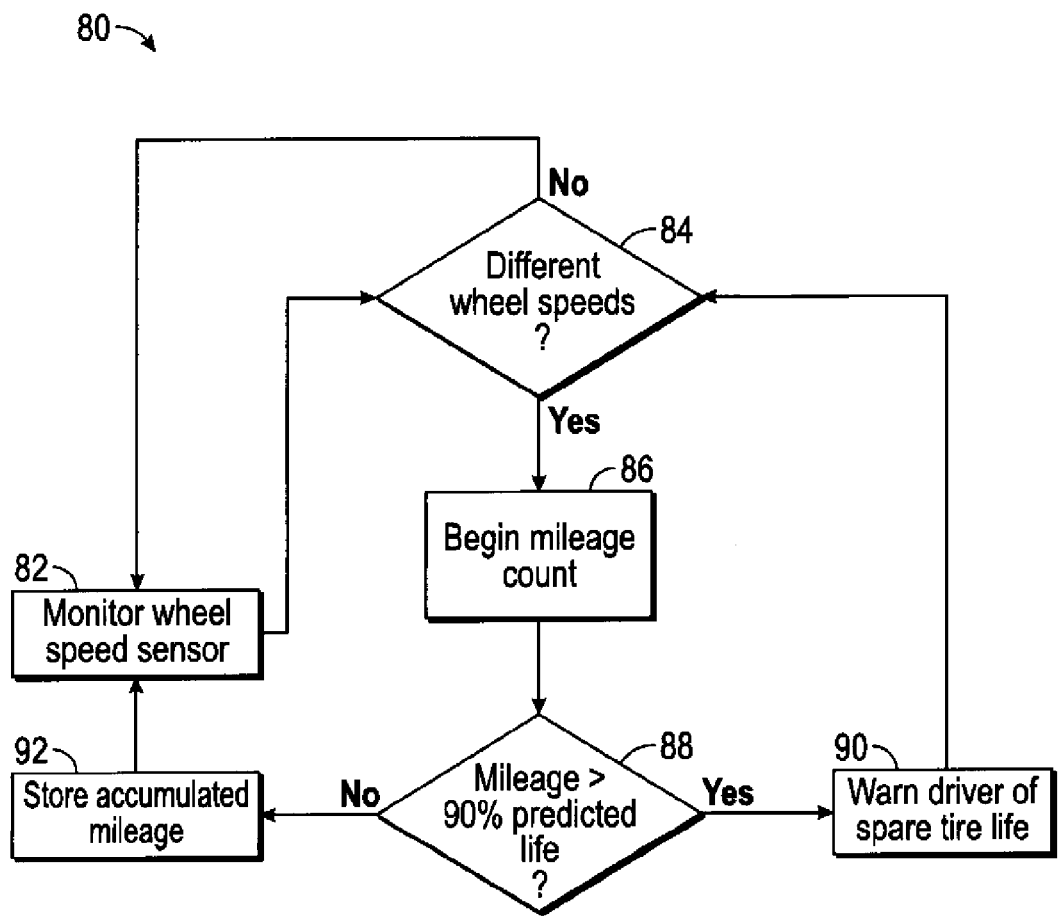
FIG. 6 is a flow diagram of another exemplary process for determining the use of a spare tire.

FIG. 6 is a flow diagram 80 of an exemplary process for determining the use of the spare wheel 18 as well as the wear on the spare wheel 18. At box 82 the speed sensors 72 monitor the rotation of the wheel 18 or 76 that they are associated with. An algorithm running in the controller 74 determines if the spare wheel 18 is being used at decision diamond 84. Using the speed sensors 72, the algorithm determines whether the speed difference between one of the sensors 72 and the other three sensors 72 meets a predetermined threshold that indicates the spare wheel 18 is being used at the decision diamond 84. The speed of the spare wheel 18 as measured by the appropriate sensor 72 is expected to be faster than the other three tires 76 due to the difference in size. Thus, a signal processor in the controller 74 is able to determine if the spare wheel 18 is being used by counting the number of rotations of the wheels using the sensors 72 and comparing the determined number of rotations to a predetermined maximum allowable number of rotations.

If one of the sensors 72 indicates a different speed than the other sensors 72, a determination is made whether a predetermined speed threshold difference has been achieved. A low tire will not trigger the predetermined threshold rotation speed difference associated with the spare wheel 18 because the change in an effective circumference of one of the wheels 76 caused by low tire pressure is not large enough to significantly change the rotation speed of the wheel such that the predetermined threshold that indicates the spare wheel 18 is being used is triggered. This is due to the fact that the number of revolutions of a tire per distance traveled is not as dependent on air pressure as it is on the length/circumference of the steel belt used in the tire. For example, a low tire (22 psi air pressure as opposed to the nominal 35 psi air pressure) is likely to cause a change of approximately 6 revolutions per kilometer, whereas the use of a spare tire may cause approximately a 90 revolution per kilometer change. Since the belt length does not change with air pressure, moderately low air pressure will have a minimal effect on the rotation speed of the tire. Additionally, a check of a tire pressure monitoring system may be embedded in the logic because if the spare wheel 18 is installed, the air pressure in the damaged tire is likely to have set off the low air pressure monitor for that particular tire. Thus, this may serve as a second check to ensure the spare tire is in use.

Once it is determined that the spare wheel 18 has been detected at the decision diamond 84, a timer of the controller 74 is set at box 86 to measure the use of the spare wheel 18 using both time from the timer and speed as determined by known techniques. Using the timer of the controller 74 and the appropriate sensor 72, wear on the spare tire is calculated, monitored and stored in a memory of the controller 74. If the spare wheel 18 is removed, as indicated by the sensor 72 via a change in the measured rotation speed, the amount of use of the spare wheel 18 is stored in a memory of the controller 74 such that if the spare wheel 18 is again used the previous wear is considered. Once a predetermined life, i.e., a predetermined usage of the spare wheel 18 that has been determined to be the maximum allowable usage, is close to being reached, for example, when approximately 90% of the predetermined life of the spare wheel 18 has been used, as determined at decision diamond 88, the driver is warned that the spare wheel 18 needs replacing at box 90. The warning may include an indicator light, an alarm, information regarding the closest service center using a vehicle display or communication device such as OnStar™, etc. If the predetermined life of the spare wheel 18 is not close to being reached, as determined at the decision diamond 88, the algorithm stores the accumulated mileage at box 92 and returns to the box 82 to continue monitoring the speed sensors 72.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A spare wheel system, said system comprising:
a carbon fiber composite vehicle rim suitable for use with a spare tire;
a lightweight tire that is suitable for use with the carbon fiber composite rim, said lightweight tire and said rim creating a lightweight spare wheel that may be used on a vehicle;
a plurality of sensors, wherein a sensor is associated with each wheel that is in use on the vehicle, each sensor monitoring the rotational speed of the wheel that the sensor is associated with; and
a controller, said controller programmed to receive signals from the sensors, said controller further programmed to determine whether the spare wheel is being used based on the signals from the sensors and to track a distance driven using the spare wheel, wherein each of the sensors provides a signal only when the wheel that the sensor is associated with is in use.

2. The system according to claim 1 wherein the carbon fiber composite rim is thermoset and includes reinforcing fibers that are randomly oriented.

3. The system according to claim 1 wherein the carbon fiber composite rim is thermoset and includes reinforcing fibers that run at particular angles.

4. The system according to claim 1 wherein the lightweight tire includes woven fiber belts or polyester belts.

5. The system according to claim 1 wherein the lightweight tire is foam-filled, tubed, or an advanced run flat tire.

6. The system according to claim 1 wherein the controller determines if the spare wheel is being used if the difference between the rotational speed of one of the sensors compared to the remaining sensors on the vehicle reaches a predetermined threshold.

7. The system according to claim 1 wherein the controller monitors the time that the spare wheel is being used such that a driver of the vehicle is warned if a determined wear of the spare wheel achieves a predetermined threshold.

8. The system according to claim 7 wherein the predetermined threshold is when 10% of a predetermined life of the spare wheel remains.

9. A method for using a spare wheel, said method comprising:
providing a carbon fiber composite vehicle rim that is suitable for use with a spare tire;
providing a lightweight tire that is suitable for use with the carbon fiber composite rim, said lightweight tire and said rim creating a lightweight spare wheel that may be used on a vehicle;
providing a sensor, said sensor embedded in the lightweight tire, said sensor sending a signal when the spare wheel is in use; and
providing a controller, said controller programmed to the receive signal from the sensor to determine the use of the spare wheel, wherein the sensor provides a signal only when the spare wheel is in use.

10. The method according to claim 9 wherein the carbon fiber composite rim is thermoset and includes reinforcing fibers that are randomly oriented.

11. The method according to claim 9 wherein the carbon fiber composite rim is thermoset and includes reinforcing fibers that run at particular angles.

12. The method according to claim 9 wherein the lightweight tire includes woven fiber belts or polyester belts.

13. The method according to claim 9 wherein the lightweight tire is foam-filled, tubed, or an advanced run flat tire.

14. The method according to claim 9 wherein sensor sends the signal and the controller receives the signal wirelessly.

15. The method according to claim 9 further comprising programming the controller to monitor the time that the spare wheel is being used, and the controller also monitors vehicle speed during the use of the spare wheel such that a driver of the vehicle is warned if a predetermined wear threshold of the spare wheel is achieved.

16. The method according to claim 15 wherein the predetermined wear is when 10% of a predetermined life of the spare wheel is remaining.

17. A lightweight spare tire system, said system comprising:
a carbon fiber composite vehicle rim suitable for use with a spare tire;
a lightweight tire that is suitable for use with the carbon fiber composite rim, said lightweight tire and said rim creating a lightweight spare wheel that may be used on a vehicle; and
at least one sensor, said sensor monitoring the rotational speed of the wheel that the sensor is associated with, and a controller, said controller receiving signals from the sensor, said controller programmed to determine if the spare wheel is being used based on the signals provided from the sensor, wherein the at least one sensor provides a signal only when the wheel that the sensor is associated with is in use.

18. The system according to claim 17 wherein the carbon fiber composite rim is thermoset and includes reinforcing fibers that are randomly oriented or that run at particular angles.

19. The system according to claim 17 wherein the lightweight tire includes woven fiber belts or polyester belts, or the lightweight tire is foam-filled, tubed, or an advanced run flat tire.

* * * * *